UNITED STATES PATENT OFFICE.

FRANC J. JEWETT, OF NEW YORK, N. Y., ASSIGNOR TO H. W. JOHNS-MANVILLE COMPANY, A CORPORATION OF NEW YORK.

NON-CONDUCTING COMPOUND.

No. 923,358.     Specification of Letters Patent.     Patented June 1, 1909.

Application filed May 8, 1906. Serial No. 315,829.

*To all whom it may concern:*

Be it known that I, FRANC J. JEWETT, a citizen of the United States of America, and a resident of the borough of Brooklyn, city of New York, county of Kings, and State of New York, have invented certain new and useful Improvements in Non-Conducting Compounds, of which the following is a specification.

My invention relates to non-heat conducting compounds and has for its principal object the production of a loose filler for use in preventing radiation to and conduction of heat to and from steam pipes and the like when laid in trenches or conduits.

To this end it comprises a mechanical mixture of loose short fibered asbestos, disintegrated or shredded sponge fiber, granulated cork and infusorial earth. While these constituents may be used in varying proportions, I find a mixture containing about 40 per cent. of asbestos fiber, 30 per cent. of sponge, 15 per cent. of cork, and 15 per cent. of infusorial earth to give good results.

The cork gives lightness and bulk to the compound and resistance to compression or packing action, either of pressure or moisture, which packing action of course would lower the heat insulating properties of the mixture, and might leave a portion of the pipes exposed. Preferably the cork should be first treated with a compound of boron such as borax or boracic acid in order to render it fireproof.

The mixture is made up and handled in bulk and deposited in the trench, conduit or casing inclosing the pipe in sufficient quantity to fill same and cover the pipe on all sides.

While I have mentioned particularly the covering of pipes as the preferred use of my invention, of course it is applicable to all other heating, insulating and non-conducting purposes.

I am aware that the various elements in my compound have individually been suggested as the constituents of non-heat conducting compounds, but I believe that I am the first to combine them all and thereby produce an article which has all of the various advantages derived therefrom. Furthermore, the treatment of the cork with a compound of boron, rendering the same fireproof, adds greatly to the advantages of my invention as a protecting envelop where high temperatures are involved.

Having, therefore, described my invention, I claim:—

1. A composition of matter for use in heat insulation comprising short asbestos fiber, granulated cork, disintegrated sponge treated with a boron compound and infusorial earth.

2. A composition of matter for use in heat insulation comprising short asbestos fiber, granulated cork, disintegrated sponge, and infusorial earth in substantially the proportions specified, the cork being treated with boracic acid.

Signed at New York this 1st day of May 1906.

FRANC J. JEWETT.

Witnesses:
    J. P. WINDECKER,
    E. D. PAKENHAM.